(12) United States Patent
Dhollander et al.

(10) Patent No.: US 10,360,249 B2
(45) Date of Patent: Jul. 23, 2019

(54) SYSTEM AND METHOD FOR CREATION AND DETECTION OF PROCESS FINGERPRINTS FOR MONITORING IN A PROCESS PLANT

(71) Applicant: D Square n.v., Hasselt (BE)

(72) Inventors: Thomas Dhollander, Zwijnaarde (BE); Bert Baeck, Temse (BE); Stijn Meganck, Deurne (BE)

(73) Assignee: Trendminder N.V., Hasselt (BE)

( * ) Notice: Subject to any disclaimer, the term of this patent is extended or adjusted under 35 U.S.C. 154(b) by 349 days.

(21) Appl. No.: 14/982,002

(22) Filed: Dec. 29, 2015

(65) Prior Publication Data

US 2016/0299966 A1    Oct. 13, 2016

Related U.S. Application Data (60) Provisional application No. 62/145,906, filed on Apr. 10, 2015.

(51) Int. Cl.
| | |
|---|---|
| *G06F 16/00* | (2019.01) |
| *G06F 16/33* | (2019.01) |
| *G06F 16/22* | (2019.01) |
| *G06F 17/10* | (2006.01) |
| *G06K 9/00* | (2006.01) |
| *G05B 23/02* | (2006.01) |

(52) U.S. Cl.
CPC ....... *G06F 16/334* (2019.01); *G05B 23/0227* (2013.01); *G06F 16/22* (2019.01); *G06F 16/3331* (2019.01); *G06F 17/10* (2013.01); *G06K 9/0055* (2013.01)

(58) Field of Classification Search
CPC .......... G06F 19/20; G06F 19/24; G06F 17/10; G06F 16/22; G06F 16/3331; G06F 16/334; B28B 17/0081; G05B 23/0227
See application file for complete search history.

(56) References Cited

U.S. PATENT DOCUMENTS

| | | | |
|---|---|---|---|
| 8,762,301 B1 | 6/2014 | Buckbee | |
| 9,124,581 B2 * | 9/2015 | Akil | .................. G05B 19/0428 |
| 9,244,042 B2 * | 1/2016 | Rank | ..................... H04R 29/00 |
| 2002/0141901 A1 * | 10/2002 | Lewis | ................ G01N 15/0826 |
| | | | 422/82.01 |
| 2005/0065732 A1 * | 3/2005 | Tilton | ..................... G06F 19/24 |
| | | | 702/19 |

(Continued)

FOREIGN PATENT DOCUMENTS

WO    2009/023659 A1    2/2009

*Primary Examiner* — Merilyn P Nguyen (74) *Attorney, Agent, or Firm* — 24IP Law Group USA, PLLC; Timothy Dewitt (57) ABSTRACT

An online monitoring method and system (10) is disclosed. The system comprises a process data connection device (20) for the acquisition of a first set of process data (30) coming from a process data source (40), an input system (50) for the creation of a process fingerprint (60), a storage device (70) for storing the created process fingerprint (60), a data processing device (80) for calculating the distance between the stored process fingerprint (60) and the new sets of process data (30), a management device (75) for managing which fingerprints need to be evaluated and a feedback device (77) which handles the actions that need to be performed based on detection such as displaying the distance (90) on an output device (100).

11 Claims, 9 Drawing Sheets

(56) References Cited

U.S. PATENT DOCUMENTS

| | | | | |
|---|---|---|---|---|
| 2006/0224254 A1* | 10/2006 | Rumi | ............... | G05B 13/0275 |
| | | | | 700/28 |
| 2006/0224434 A1* | 10/2006 | Rumi | ................... | G06Q 10/06 |
| | | | | 705/7.27 |
| 2012/0197911 A1* | 8/2012 | Banka | ................... | H04L 67/12 |
| | | | | 707/752 |
| 2014/0335480 A1* | 11/2014 | Asenjo | ................. | G09B 19/18 |
| | | | | 434/107 |
| 2015/0057788 A1* | 2/2015 | Cantwell | ............ | G05B 23/024 |
| | | | | 700/174 |
| 2016/0259321 A1* | 9/2016 | Brunnmeier | ...... | G05B 19/4061 |

* cited by examiner

SYSTEM AND METHOD FOR CREATION AND DETECTION OF PROCESS FINGERPRINTS FOR MONITORING IN A PROCESS PLANT

CROSS-REFERENCE TO RELATED APPLICATIONS

This application claims priority to and benefit of U.S. Provisional Application No. 62/145,906 "System and Method for the Creation and Detection of Process Fingerprints for Monitoring in a Process Plant" filed by the same inventors on 10 Apr. 2015, which hereby is incorporated by reference in its entirety.

BACKGROUND OF THE INVENTION

Field of the Invention

This invention relates to a system and method for online process monitoring based on a user-defined fingerprint for a specific situation of interest.

Brief Description of the Related Art

A process monitoring system typically operates in two steps: model development, followed by model deployment. Typically some statistical techniques are applied to create a process model that represents a particular situation of interest during the model development.

During model deployment, incoming process data relevant to the developed process model are constantly fed into the process model, which provides feedback on whether that situation of interest is present in the fed process data.

One example of the development of statistical models is known from the International Patent Application No. WO2009/023659A1 entitled "System and method for continuous, online monitoring of a chemical plant or refinery". These and similar methods require the development of a statistical model of the situation of interest based on some (known) regimes of the process. These a-priori constructed models can then be evaluated with new incoming process data to detect these situations of interest. These prior art methods require a significant amount of mathematical knowledge and background information about the process, from which the user develops the statistical models. These methods do not allow the user to define the statistical models on unseen situations and require a minimal amount of reoccurrence of the situation of interest in order to develop the statistical model from process data.

SUMMARY OF THE INVENTION

The present invention relates to the use of a method, which acquires a first set of process data, related to a single occurrence or multiple occurrences of a particular situation of interest, from one or more process data sources and transforms this first set of process data into a so-called "fingerprint". This fingerprint can subsequently be used in the system to detect automatically similar situations in a second set of process data. The system enables feedback to a user when a similar situation of interest is detected.

In a process plant, the process data originating from the data sources, such as a plurality of sensors, is continuously monitored, collected and stored together with maintenance information, control parameters, lab samples and many other types of data. These process data contain information about the state of the process and form inputs for a variety of tools, such as trend viewers, alarm systems, monitoring systems, etc. The process data will have data values and time stamps.

Systems that are of interest as the data sources for use in the present disclosure include, but are not limited to:

Data historian systems, such as process information management systems containing sensor process data or laboratory information management systems containing sample analysis results.

Event logging systems, such as a maintenance management system or a process logbook, which contain contextual information concerning the process.

OPC Data Access and/or OPC Unified Architecture servers, which implement a protocol for real-time data acquisition of for instance sensor measurements.

A use of the collected process data is the continuous monitoring of the process in order to automatically detect particular situations of interest, such as impeding process upsets, regime transitions, abnormal situations, etc.

In contrast to the prior art methods of developing a statistical model for a specific situation of interest of the process, the current disclosure teaches the creation of a pattern (not a model), termed a fingerprint, which is based on aggregation of the process data of a selected set of variables in a selection of situations of interest.

The method of the current disclosure differs from the prior art on several counts:

No statistical model is created for the situation of interest, so there is no training involved.

There is no restriction on the properties of the data pattern representing the situation of interest: i.e. the fingerprint can span any time frame, any number of variables, and contain continuous data, discrete data or both.

The fingerprints are constructed and/or generated by the user and not by a mathematical model. Therefore, no background knowledge on statistical or other modeling techniques is necessary.

The fingerprints are defined on the process data, as the process data is stored in the process data sources, so there is no need to preprocess the data.

It is possible to add discrete/continuous levels of importance to selected subparts of the fingerprint, so the entire fingerprint does not need to be treated like a single entity block.

The fingerprint can be created by combining multiple sources of process data and is not limited to only sensor measurement data.

The proposed invention operates in three phases: fingerprint creation, fingerprint management, and fingerprint monitoring During the fingerprint creation, the user selects a set of process variables and a set of time frames and the fingerprint will be built based on the aggregation of the values of the selected process variables in said selected time frames. This first phase of the fingerprint creation corresponds to the model development of the prior art approaches. In contrast to the prior art approaches, no training or learning is needed in the approach proposed.

The fingerprint management comprises the explicit activation, deactivation or deletion of the created fingerprints from the first phase. This fingerprint management allows the user to have only a selected set of the fingerprints being monitored at different times. It is possible to include this second step in the traditional approach framework, in which only certain ones of the statistical models are evaluated based on some selection criteria.

During the fingerprint monitoring, the incoming data on the process variables relevant to the fingerprint are periodically compared with the fingerprint. A distance calculation is performed comparing the incoming process data with the fingerprint. The user is provided with feedback based on this comparison on whether the corresponding situation of interest is present in the incoming process data. This corresponds to the model deployment of the traditional approaches.

A process monitoring system and method is disclosed. The system and method of this disclosure can be used in a process plant equipped with at least one process data source, containing the process data obtained from an industrial process. A data connection device is used to acquire the process data, related to a set of variables and time periods selected by a user, from said process data sources and said process data is displayed on an output device to the user.

The data processing device is used to create a process fingerprint based on said process data.

At a predetermined rate, new sets of the process data are obtained through the process data connection device and the data processing device compares said new sets of data with the loaded fingerprint.

If a distance based on said comparison exceeds a predetermined threshold, feedback is given to the user by means of a feedback device. This enables pre-emptive action to be taken.

Still other aspects, features, and advantages of the present invention are readily apparent from the following detailed description, simply by illustrating a preferable embodiments and implementations. The present invention is also capable of other and different embodiments and its several details can be modified in various obvious respects, all without departing from the spirit and scope of the present invention. Accordingly, the drawings and descriptions are to be regarded as illustrative in nature, and not as restrictive. Additional objects and advantages of the invention will be set forth in part in the description which follows and in part will be obvious from the description, or may be learned by practice of the invention.

BRIEF DESCRIPTION OF THE DRAWINGS

For a more complete understanding of the present invention and the advantages thereof, reference is now made to the following description and the accompanying drawings, in which.

DETAILED DESCRIPTION OF THE INVENTION

Notations and Definitions

Variable: Throughout this description, we will use the term variable to indicate process tags or other uniquely identifiable related measurement points, such as control parameters or categorized maintenance information concerning particular equipment.

Polling: We refer to the action of periodically acquiring data concerning a (set of) variable(s) from a process data source as polling. For online monitoring this is typically done each fixed time step (e.g. every minute) such that a new set of data over a specific predetermined time frame ending at the latest polling time can be evaluated.

Figure 1:
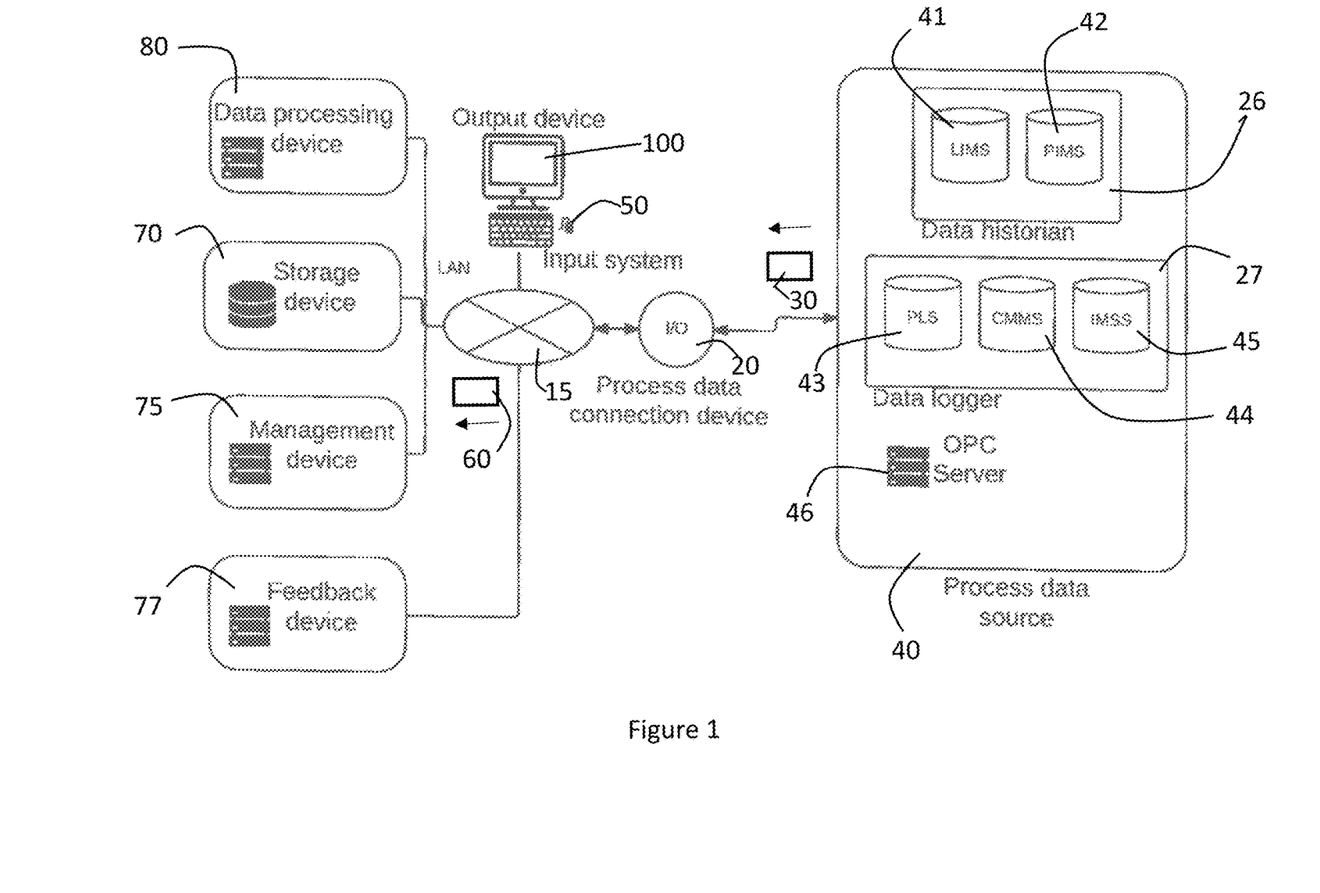
FIG. 1 shows a configuration diagram for the system.

FIG. 1 shows an online process monitoring system 10. The online process monitoring system 10 of the disclosure can be used for analysis of multiple different types of industrial processes, including but not limited to chemical refineries, power plants, pharmaceutical manufacturing, car plants, and food production.

The industrial process monitoring system 10 comprises a process data connection device 20 connected to a plurality of data sources 40 through a local area network (LAN) 15, which can be formed by an Ethernet cable connection or a Wi-Fi network using the 802.xx standard, but this is not limiting of the invention. The process data connection device 20 enables the acquisition of process data 30 and is connected to at least one of the process data sources 40. Example of the data sources 40 include, but are not limited to a data historian system 26 such as a laboratory information management system (LIMS) 41 or process information management system (PIMS) 42, a data logger 27 such as PLS 43, computer maintenance management system (CMMS) 44 or IMMS 45, and an object linking and embedding for process control (OPC) Server 46.

The industrial process monitoring system 10 further comprises an input system 50 with a computer display and at least one device for user input allowing a user to create a process fingerprint 60 as will be explained later and store the process fingerprint 60 on a storage device 70, such as a file server.

The industrial process monitoring system 10 further comprises a management device 75 managing which of the created process fingerprints are active for online monitoring.

The industrial process monitoring system 10 further comprises a data processing device 80 which loads one or more of the process fingerprint 60 from the storage device 70, obtains the process data 30 from the process data connection device 20 and calculates the distance between the obtained process data 30 and the loaded fingerprint 60. A feedback device 77, for example a mail server, provides feedback to the user for instance by sending mails, adding context information in the data logger 27, such as a CMMS 44, or by sending the distance to an output device 100, which can display the distance to the user.

The input system 50 and the output device 100 are connected to the data processing device 80 through the network and exchange information using the OSI layer 7 HTTP or HTTPS protocols. It will be appreciated that the input system 50 and the output device 100 might be identical.

It will be appreciated that multiple devices can be physically located on the same hardware. Further it will be appreciated that multiple input and output devices could be present in the configuration of the current invention. It will be appreciated that the described setup is one of several envisioned configurations of the invention. In another embodiment of the invention, either or all of the process data sources, data processing device, data storage device are located in a local, private or public data center (cloud).

The method of this disclosure will now be described. The method operates in three steps: fingerprint creation, fingerprint management and fingerprint monitoring.

Fingerprint Creation

Figure 2:
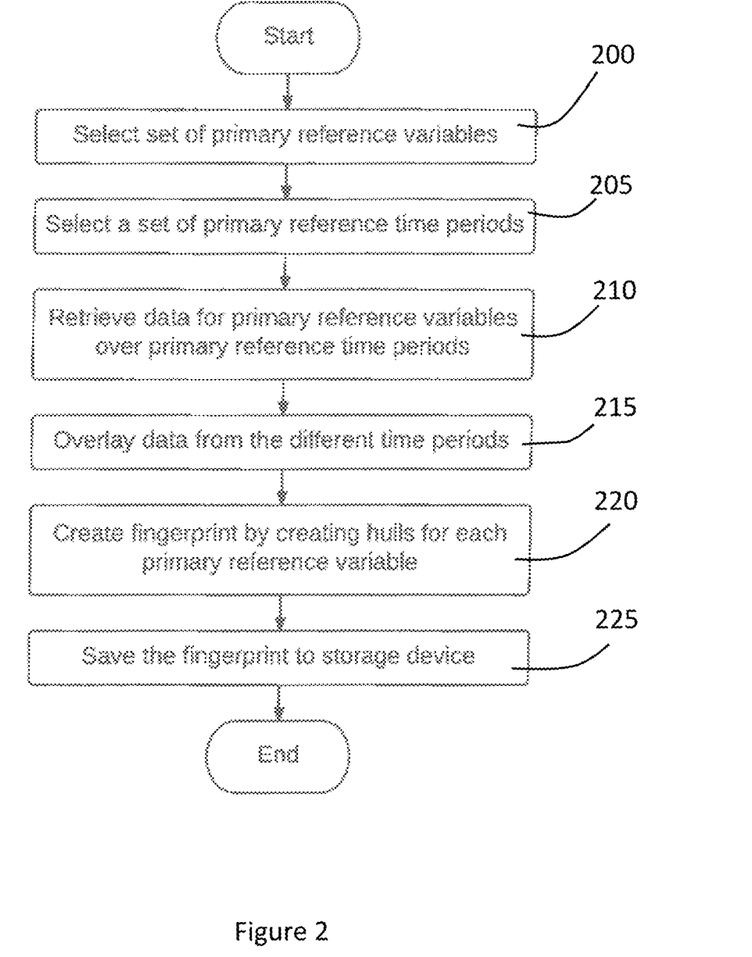
FIG. 2 shows a flowchart of a method for the creation of process fingerprints from process data.

FIG. 2 shows a flowchart of a method for creating a process fingerprint 60 of a selected situation from the process data 30. The method starts at 200 with the user selecting a set of reference variables $X=\{X_1, \ldots, X_n\}$. The set of selected reference variables are often variables that are important for a specific situation, such as a process upset. In the next step 205, a set of equal length (l) time periods $P=\{[P_1b, P_1e], \ldots, [P_m^b, P_m^e]\}$ are selected. Typically, these time periods P all contain the process data concerning the same type of situation. For instance in a non-limiting example, each time period P comprises two hours preceding a specific asset failure occurrence e.g. a pump failure. For each of the time periods $[P_j^b, P_j^e]$, the process data 30 $[X_{ij1}, \ldots, X_{ijl}]$, where $X_{ijk}$ represents the k'th value of variable $X_i$ in time period $[P_j^b, P_j^e]$, for each variable $X_i$ is retrieved from the corresponding process data source by means of the process data connection device 20 in step 210.

The next step 215 is to align the process data 30 from the different time periods P. In step 220, the hulls $H_1, \ldots, H_n$ of the aligned data are created for each of the variables, which form a process fingerprint 60 $F<H_1, \ldots, H_n>$. A hull $H_i$ for a variable $X_i$ consists of $\{\overline{H_{i1}}, \ldots, \overline{H_{il}}, \underline{H_{i1}}, \ldots, \underline{H_{il}}\}$ and is constructed as follows:

$$\overline{H_{ik}} = \max_j(X_{ijk})$$

$$\underline{H_{ik}} = \min_j(X_{ijk})$$

The resulting process fingerprint 60 $<H_1, \ldots, H_n>$ is stored on the storage device 70 together with some unique process fingerprint identifier.

It will be appreciated that in the special case where there is only one time period, such that $P=\{[P_1^b, P_1^e]\}$, and corresponding process data 30 $[X_i^{i1}, \ldots, X_i^{1l}]$, the hulls are simply the values of the process data and thus $\overline{H_{ik}}=\underline{H_{ik}}=X_{i1k}$.

Figure 3A:
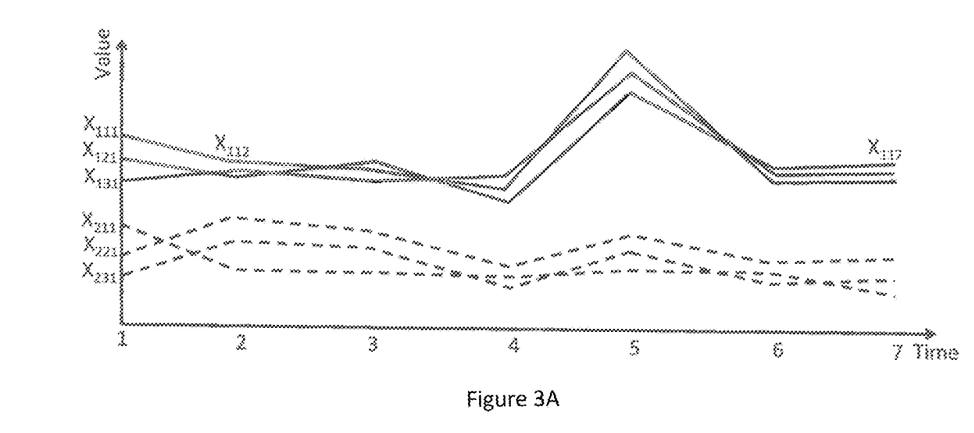
FIGS. 3A and 3B show a non-limiting example of the creation of a process fingerprint.
Figure 3B:
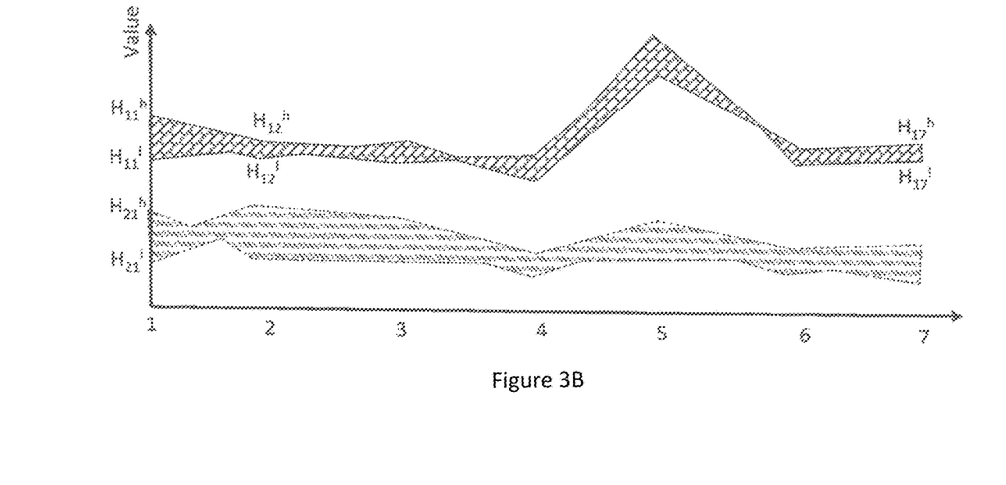

FIGS. 3A and 3B show a non-limiting example of the creation of a fingerprint. In the top axes the values of two variables $X_1$ and $X_2$ are shown for three time periods of length 7 units. In the bottom axes the hulls of the corresponding variables are shown. The fingerprint 60 F corresponding to this example consists of the tuple $<H_1, H_2>$.

Fingerprint Management

The management device 75 keeps a list of all of the process fingerprints 60 created by the user. The management device 75 allows the possibility to activate, deactivate and delete existing ones of the process fingerprints 60. During the fingerprint monitoring, only the activated process fingerprints 60 will be evaluated.

The list of all (active and inactivate) process fingerprint identifiers can be displayed to the user on the output device 100. The user can use the input system 50 to select which ones of the process fingerprints 60 to activate, deactivate or delete. Once the process fingerprint 60 is deleted, its corresponding fingerprint identifier is no longer visible in the list of process fingerprints outputted to the user.

In one aspect of this method, the activation and the deactivation of the process fingerprints 60 can be automated, for instance based on real-time context information stored in the data logger 27.

Figure 9:
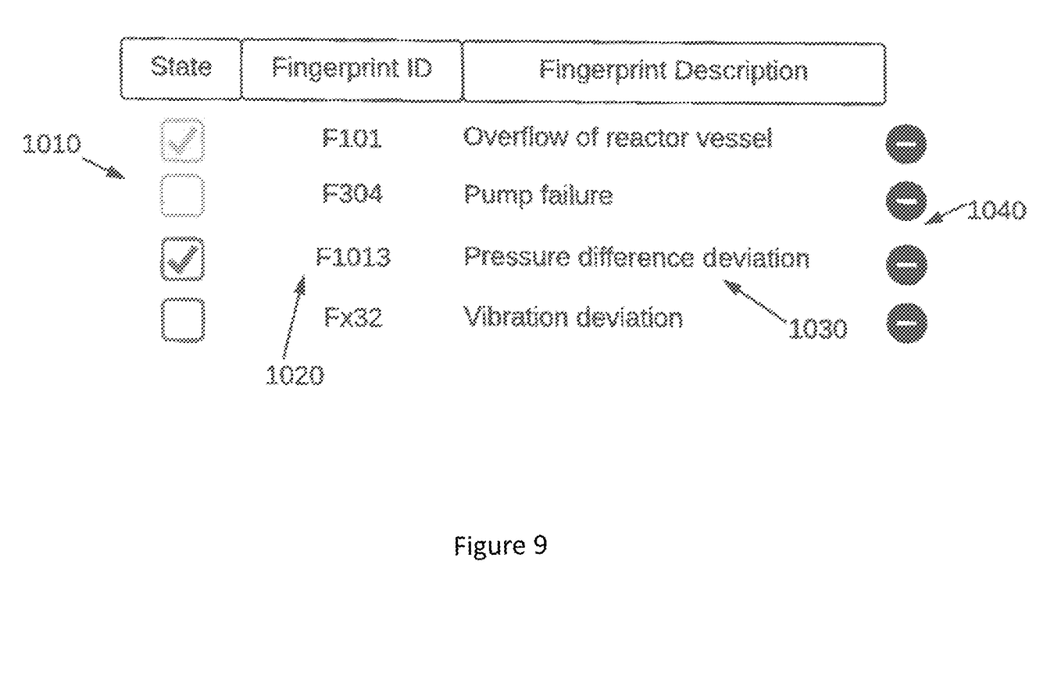
FIG. 9 shows a non-limiting example of a potential screen design for managing the process fingerprints.

FIG. 9 shows a non-limiting example of a potential screen design for managing the process fingerprints 60. The exemplary screen design comprises an overview of all of the created process fingerprints with their corresponding fingerprint identifier 1020 and an indication of whether they are active or deactivated by means of checkboxes 1010. Furthermore, there is the possibility to delete any of the process fingerprints 60 by means of clicking the delete icons 1040. Potentially extra information such as a fingerprint description 1030 is shown as well.

Fingerprint Monitoring

During fingerprint monitoring for each of the active process fingerprints 60, the following steps are undertaken:
  Systematically obtain corresponding the process data 30 from either the OPC Server 46 or by polling the data sources to obtain a data stream.
  Calculate the distance of the data stream to the process fingerprint 60.
  Provide feedback to the user by means of the feedback device 77 if said calculated distance exceeds a predetermined threshold.

The OPC server 46 DA provides real-time data from data sources 40, such as sensors. Whenever new measurements of the process data are received for all of the relevant variables making up the process fingerprint 60, the distance of the process data received up until the latest relevant time frame to the process fingerprint 60 is calculated. Alternatively the process data can be acquired by polling the data sources 40. The actual method, which will be applied in practice, will depend on the configuration of each particular process.

Figure 4:
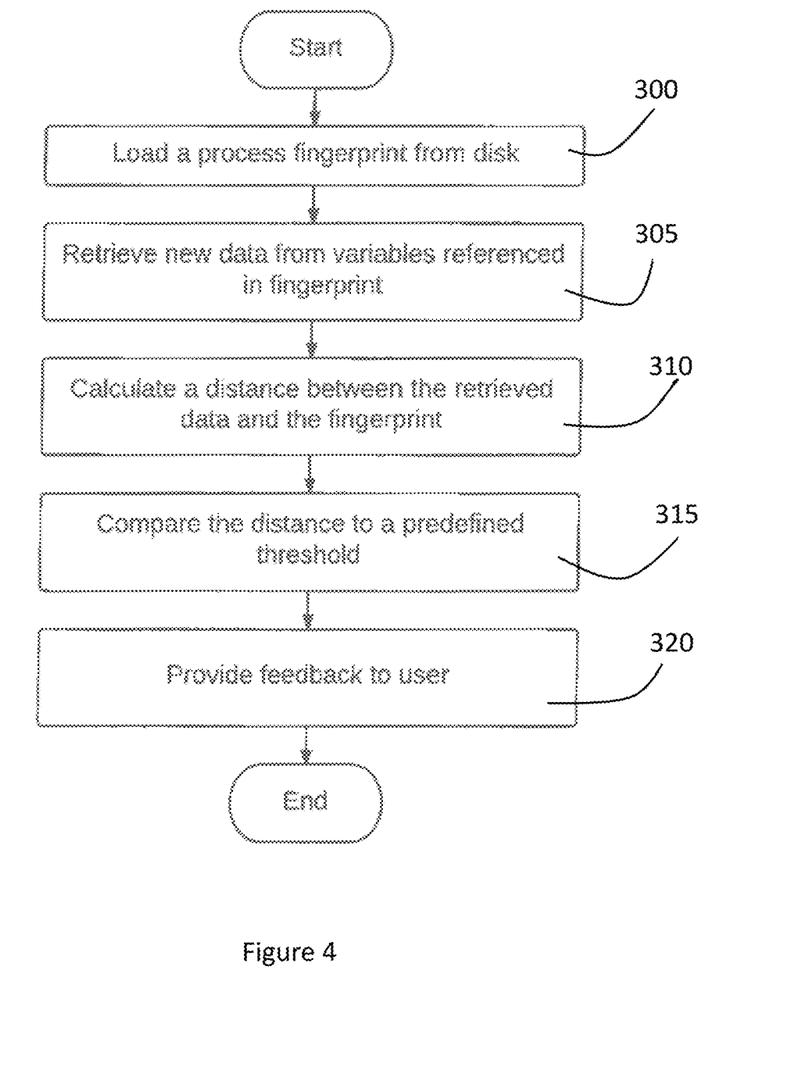
FIG. 4 show a flowchart for the detection of process fingerprints from process data.

FIG. 4 shows a flowchart of a method using the system of FIG. 1 for detecting process fingerprints 60 from the process data 30. In step 300 the process fingerprint 60 F is loaded from the storage device 70. The process fingerprint 60 F consists of a tuple $<H_1, \ldots, H_n>$ corresponding to the hulls of values variables $X_1, \ldots, X_n$ over time periods of length l as described above. Next in step 305, the new process data 30 over a new time period of length l of the corresponding variables $X_1, \ldots, X_n$ is retrieved by the process data connection device 20. Denote by $\chi_{ij}$ the j'th value of the variable $X_i$ in the new process data 30.

In step 310, a distance d is calculated between this new data and the fingerprint F. In one embodiment of the invention the distance between the new data and the fingerprint F is calculated as follows:

$$d = \sum_{i=1}^{n} \sum_{j=1}^{l} \left(1 - \delta_{\underline{H_{ij}} \leq \chi_{ij} \leq \overline{H_{ij}}}\right) * \min(|\overline{H_{ij}} - \chi_{ij}|, |\underline{H_{ij}} - \chi_{ij}|)$$

where $$\delta_{\underline{H_{ij}} \leq \chi_{ij} \leq \overline{H_{ij}}}$$

is 1 when $\underline{H_{ij}} \leq \chi_{ij} \leq \overline{H_{ij}}$ and 0 otherwise.

In step 315 the distance d is compared to some predefined threshold. If a threshold was passed, then feedback is given to the user by means of the feedback device 77 in step 320.

When multiple process fingerprints F 60 are active the steps 300, 305, 310, 315 and 320 are applied for all of the multiple process fingerprints F 60.

Figure 5:
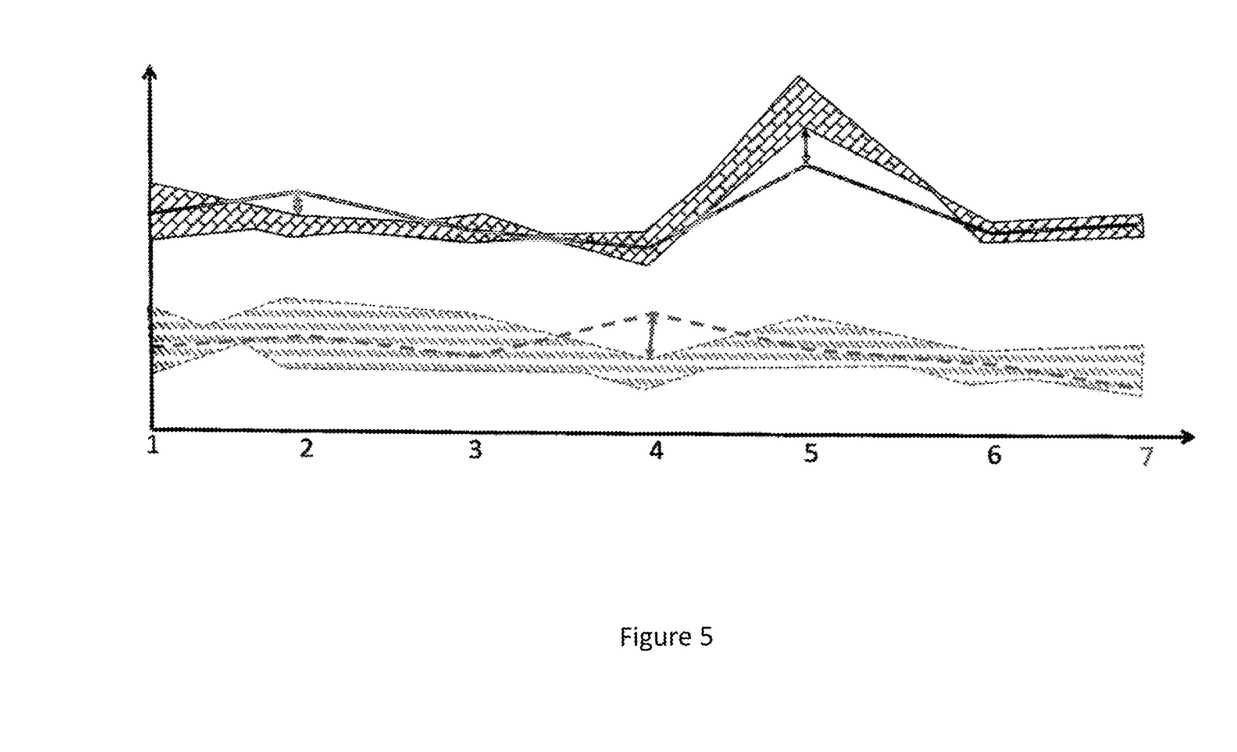
FIG. 5 shows a non-limiting example of the distance calculation of a process fingerprint and process data.

FIG. 5 shows a non-limiting example of the distance calculation of a fingerprint 60 represented by the hulls on the figure and process data represented by the lines. The distance of the process data to the fingerprint according to the example distance provided above is the sum of the lengths of the two-sided arrows. This corresponds to parts of the process data that fall out of the corresponding hulls of the fingerprint 60.

Weights

In an additional aspect of the method it is possible to assign positive weights to subparts of the process fingerprint 60 in order to penalize dissimilarities corresponding to these subparts between the fingerprint 60 and the new data based on these weights. For each hull $H_i$ consisting of $\{\overline{H_{i1}}, \ldots, \overline{H_{il}}, \underline{H_{i1}}, \ldots, \underline{H_{il}}\}$ a corresponding list of positive weights $\{W_{i1}^+, \ldots, W_{il}^+\}$ can be provided. It is then possible to calculate the weighted distance $d_w$ between the new data and the process fingerprint 60 F as follows:

$$d_w = \sum_{i=1}^{n} \sum_{j=1}^{l} \left(1 - \delta_{\underline{H_{ij}} \leq \chi_{ij} \leq \overline{H_{ij}}}\right) * \min(|\overline{H_{ij}} - \chi_{ij}|, |\underline{H_{ij}} - \chi_{ij}|) * W_{ij}^+$$

where again $$\delta_{\underline{H_{ij}} \leq \chi_{ij} \leq \overline{H_{ij}}}$$

is 1 when $\underline{H_{ij}} \leq \chi_{ij} \leq \overline{H_{ij}}$ and 0 otherwise. Note that for parts which are not assigned weight all $W_{ij}^+ = 1$, and for parts which can be ignored all $W_{ij}^+ = 0$.

In an alternative aspect of the method, it is possible to assign negative weights to subparts of the process fingerprint 60 in order to reward dissimilarities corresponding to these subparts between the process fingerprint 60 and the new process data 30 based on these weights. For each hull $H_i$ consisting of $\{\overline{H_{i1}}, \ldots, \overline{H_{il}}, \underline{H_{i1}}, \ldots, \underline{H_{il}}\}$ a corresponding list of negative weights $\{W_{i1}^-, \ldots, W_{il}^-\}$ can be provided. It is then possible to calculate the weighted distance $d_w$ between the new data and the process fingerprint 60 F as follows:

$$d_w = \sum_{i=1}^{n} \sum_{j=1}^{l} \left(1 - \delta_{\underline{H_{ij}} \leq \chi_{ij} \leq \overline{H_{ij}}}\right) * \max(\Lambda - \min(|\overline{H_{ij}} - \chi_{ij}|, |\underline{H_{ij}} - \chi_{ij}|), 0) * |W_{ij}^-|$$

where again $$\delta_{\underline{H_{ij}} \leq \chi_{ij} \leq \overline{H_{ij}}}$$

is 1 when $\underline{H_{ij}} \leq \chi_{ij} \leq \overline{H_{ij}}$ and 0 otherwise and $\Lambda$ represents some predetermined positive value. Note that for parts, which are not assigned, weight all $W_{ij}^- = 1$, and for parts, which can be, ignored all $W_{ij}^- = 0$.

It will be appreciated that both positive and negative weights can be combined.

Figure 6:
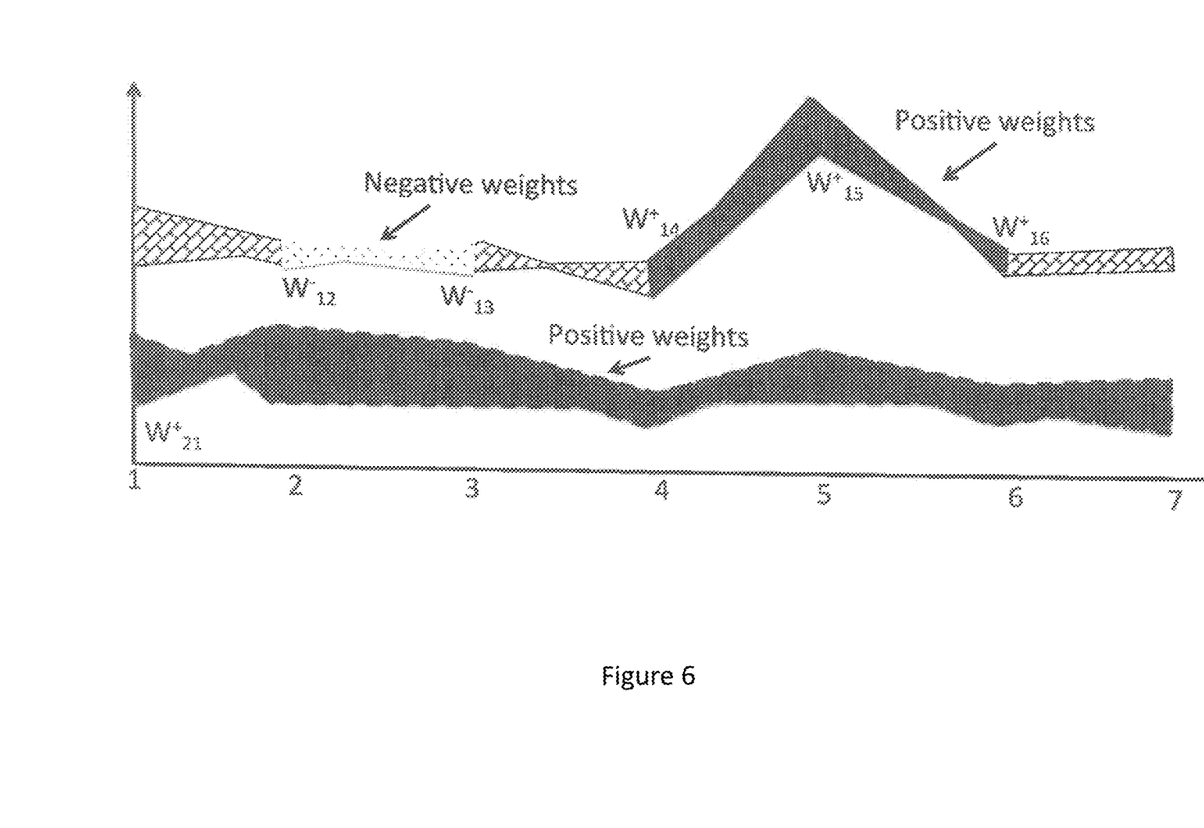
FIG. 6 shows a non-limiting clarification of the addition of weights to a process fingerprint.

FIG. 6 shows a non-limiting clarification of the addition of weights to the process fingerprint 60. In this example, the positive weights $\{W_{14}^+, W_{15}^+, W_{16}^+\}$ are assigned to the corresponding part of the hull of the first variable and $\{W_{21}^+, \ldots, W_{27}^+\}$ to the whole hull of the second variable. The negative weights $\{W_{12}^-, W_{13}^-\}$ are assigned to the corresponding part of the hull of the first variable. This particular fingerprint 60 would indicate that the most important part of the situation is the presence of the peak at relative times 4-6 together with a pretty flat trend of the second variable. Furthermore, flatness in the first variable at relative times 2-3 is being penalized.

Smoothing

In an alternative embodiment of the method, it is possible to create smoother hulls based on some smoothing parameter $\rho$. This reduces the risk to overfit the hull based on a limited number of periods. A smoothed hull $\mathcal{H}$ consists of $\{\overline{\mathcal{H}_{i1}}, \ldots, \overline{\mathcal{H}_{il}}, \underline{\mathcal{H}_{i1}}, \ldots, \underline{\mathcal{H}_{il}}\}$ and is constructed as follows:

$$\overline{\mathcal{H}_{ik}} = \max_{j}(X_{ij,\max(k-\rho,0)}, \ldots, X_{ij,\min(k+\rho,l)})$$

$$\underline{\mathcal{H}_{ik}} = \min_{j}(X_{ij,\max(k-\rho,0)}, \ldots, X_{ij,\min(k+\rho,l)})$$

It is then possible to calculate the smooth distance $d_s$ between the new data and the process fingerprint 60 F by replacing $\overline{H_{ij}}$ with $\overline{\mathcal{H}_{ij}}$ and $\underline{H_{ij}}$ with $\underline{\mathcal{H}_{ij}}$:

$$d_s = \sum_{i=1}^{n} \sum_{j=1}^{l} \left(1 - \delta_{\underline{\mathcal{H}_{ij}} \leq \chi_{ij} \leq \overline{\mathcal{H}_{ij}}}\right) * \min(|\overline{\mathcal{H}_{ij}} - \chi_{ij}|, |\underline{\mathcal{H}_{ij}} - \chi_{ij}|)$$

where again $\delta_{\underline{\mathcal{H}_{ij}} \leq \chi_{ij} \leq \overline{\mathcal{H}_{ij}}}$ is 1 when $\underline{\mathcal{H}_{ij}} \leq \chi_{ij} \leq \overline{\mathcal{H}_{ij}}$ and 0 otherwise.

It will be appreciated that this equation can be adapted similarly to those above to use both positive and negative weights.

Figure 7A:
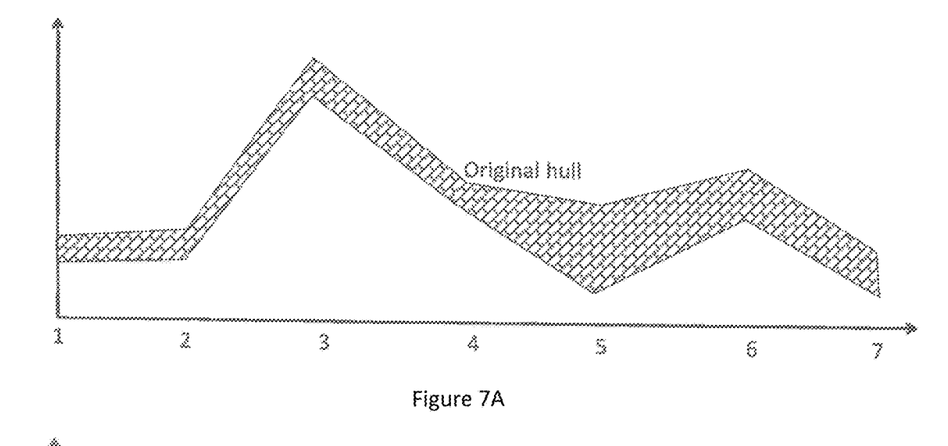
FIGS. 7A and 7B show a non-limiting clarification of the assignment of different distance measures to a process fingerprint.
Figure 7B:
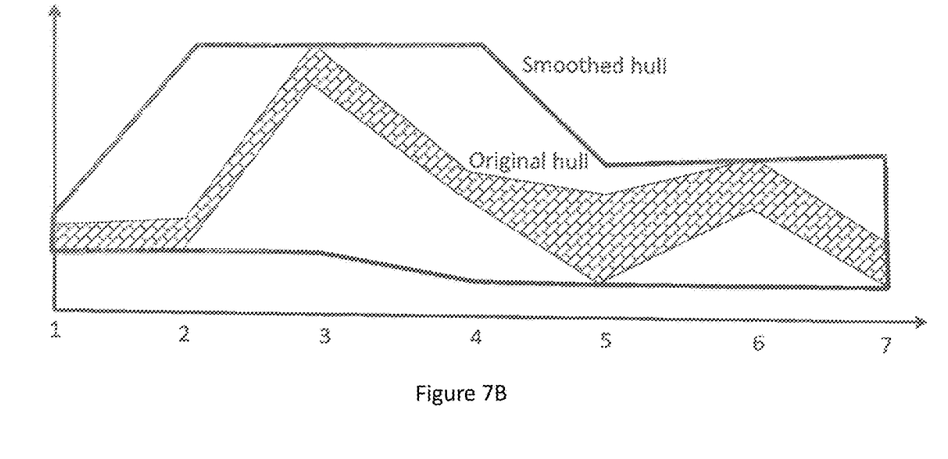

FIGS. 7A and 7B show a non-limiting clarification of the assignment of different distance measures to a process fingerprint 60 with smoothing parameter $\rho = 1$.

Distance Measures

The methods described in this invention are generic in their application and not dependent on the specific distance measure used in the calculations. In additional aspects of the current method, different distances based on measures, including but not limited to, the following can also be used: dynamic time warping, Euclidean distance, other Minkowski distances, correlation, etc.

In an alternative aspect of the method different subparts of the process fingerprint 60 can be assigned different distance measures for calculating the dissimilarities between these subparts between the process fingerprint 60 and the new data.

Figure 8:
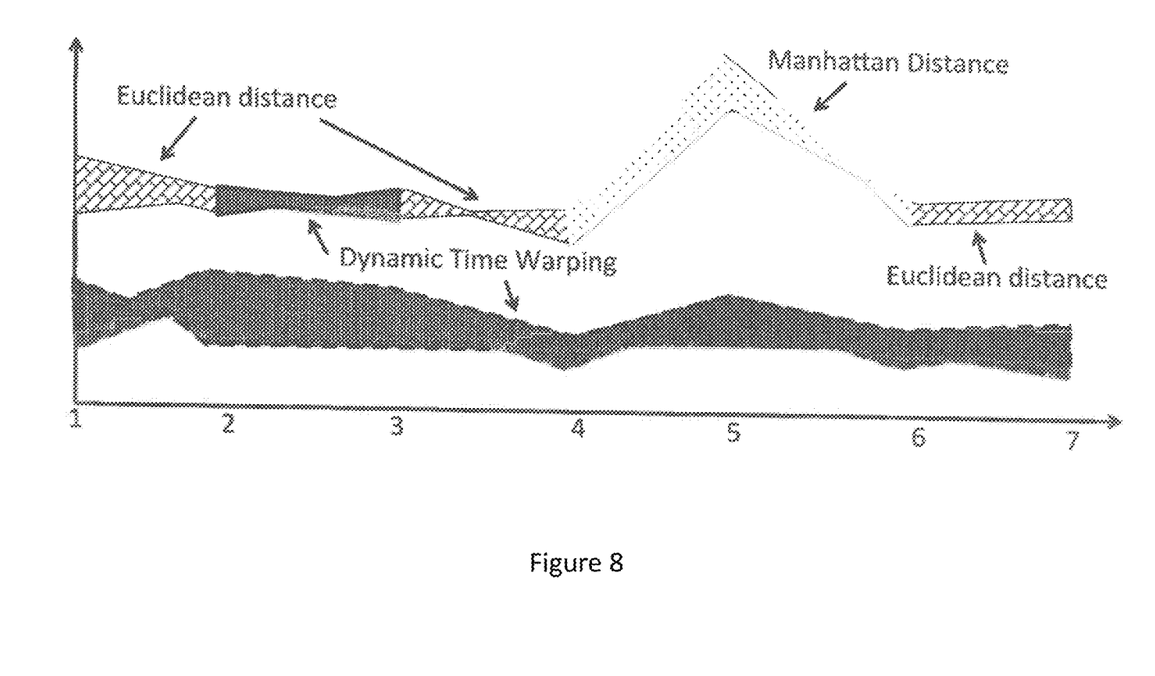
FIG. 8 shows a non-limiting clarification of the assignment of distance measures to subparts of a process fingerprint.

FIG. 8 shows a non-limiting clarification of the assignment of distance measures to subparts of a process fingerprint 60. In this example the Euclidean, Manhattan distance and DTW are assigned to the corresponding parts of the hulls of the variables.

Feedback Mechanism

The feedback device 77 will handle which actions need to be undertaken when detecting a situation of interest based on a process fingerprint 60. Actions can be defined for each process fingerprint 60 and need not be the same for each.

Feedback actions include but are not limited to:

Sending an email to relevant parties including information concerning the process fingerprint 60 that was responsible for the detection.

Logging the detection in the data logger 27, such as a PLS 43 or CMMS 44.

Providing visual feedback on the output device 100 such as a message indicating the identifier of the process fingerprint 60 and the time at which the detection was made.

A combination of any of the above based on the roles of different users

Historical Fingerprint Matching

As an extension to the current method, the monitoring step can be mimicked on historical process data. Instead of polling or querying the OPC server 46 to obtain the new process data 30, the process data connection device 20 acquires historical data from the process data sources 40 starting from the earliest point for which data was available. It obtains the historical data in time frames with the same length as the corresponding fingerprint 60.

One can imagine that it might be interesting for a user to discover all matches to a selected one of the fingerprints 60 over the entire lifetime of an industrial plant. This could be beneficial for a process engineer trying to analyze a particular recurring failure as it allows the process engineer to identify all prior occurrences without having to rely on memory or error-prone manual loggings.

As a non-limiting example, let us assume we want to detect all of the historical matches of the process fingerprint 60 F concerning variable $X_1$ of length l. By means of the process data connection device 20, the data processing device 80 will load data of $X_1$ concerning each time frame of length l present in the data sources. For each set of historical process data 30 the distance between it and the fingerprint F will be calculated.

In an extended embodiment, a histogram of historical detection rates for a given threshold can be generated. A histogram can be kept storing the distances for each time frame in the historical data. This provides the user with information on the expected detection rate based on the historical detection rate.

Alternative Aspects

The method can be modified by means of providing an automated way to identify time periods that correspond to similar process situations, which will be used to create the process fingerprint 60.

The method can be modified by means of providing a graphical user interface, such as but not limited to a trend monitor, allowing a user to select the set of reference variables and reference time periods.

The method can be modified by means of providing a graphical user interface, such as but not limited to a trend monitor, allowing a user to create the process fingerprint 60 by drawing the hulls and assigning process variables to those hulls.

The method can be modified by means of providing an interpolation step, which, whenever process data 30 is acquired by means of the process data connection device 20, it is interpolated to guarantee equidistantly, sampled data.

Example

Non-limiting examples showing use of the method will now be described.

Let us assume that the process plant experiences recurrent pump failures at a certain location in the process. The process engineer tasked with analyzing these failures has retrieved all of the times at which these failures occurred and is looking at trends of a set of potentially relevant variables in the two hours prior to each occurrence of the failure. The process engineer notices that there is similar behavior of several tags prior to each failure. It is often impossible for the process engineer to define this behavior in simple (combinations of) threshold conditions (e.g. reactor temperature is greater than >100), which could be included in traditional alarming systems. The engineer can use this idea to create the process fingerprint 60 based on said tags and said time frames. The process fingerprint 60 is created and stored.

The engineer selects to activate this process fingerprint 60 by means of the management device 75. During monitoring of the process, the relevant measurements of the process data are fed the to data processing device 80. The data processing device 80 process the process data and compares the process data with the activated process fingerprint 60 and detects similar behavior as identified by means of the fingerprint 60.

Since the detection, in this example, is a warning for an upcoming pump failure, this would allow taking of preventive action in order to avoid the pump failure. In this manner, the fingerprint 60 can be used as a leading indicator of major failures, allowing pro-active maintenance of the pump to prevent the failure.

This process does not require any training or modeling of the prospective pump failure.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

What is claimed is:

1. A computer-implemented method for creation of industrial process fingerprints representing a situation of interest in an industrial process, the method comprising the steps of:
    selecting a set of reference process variables from a plurality of sensors monitoring the industrial process and selecting a set of reference time periods to create a set of industrial process data;
    creating an industrial process fingerprint by calculating hulls for the created set of industrial process data, wherein the calculated hulls represent bounds of the created set of industrial process data over time; and
    storing the industrial process fingerprints in a storage device.

2. The method of claim 1, wherein the industrial process data is one of discrete data sets, categorical data sets, ordinal data sets or continuous data sets.

3. The method of claim 1, further comprising smoothing the set of reference process variables prior to creating the industrial process fingerprint.

4. The method of claim 1, further comprising weighting one or more the reference process variables prior to creating the industrial process fingerprint.

5. The method of claim 1, wherein the situation of interest is one of an upset, an abnormal situation or a regime transition in the industrial process.

6. A computer-implemented method for identification of a situation of interest in an industrial process comprising:
   activating a set of industrial process fingerprints, the industrial process fingerprints representing a situation of interest in an industrial process based on hulls of a set of reference process variables from a plurality of sensors monitoring the industrial process;
   loading the activated set of industrial process fingerprints into a processor;
   acquiring industrial process data from one or more process data sources;
   calculating a distance between the acquired industrial process data and one or more of the activated set of industrial process fingerprints;
   comparing the calculated distance to a threshold value to determine whether a situation of interest represented by one or more of the activated set of industrial process fingerprints is present; and
   providing feedback on the situation of interest in the industrial process by a feedback device, wherein the feedback device will handle which actions need to be undertaken in the industrial process based on the situation of interest.

7. The method of claim 6, further comprising initiating one or more actions on determination of the situation of interest.

8. The method of claim 6, wherein the situation of interest is one of an upset, an abnormal situation or a regime transition in the industrial process.

9. An industrial process system for identification of a situation of interest comprising:
   at least one industrial process data source for selecting a set of reference process variables from a plurality of sensors monitoring the industrial process over a reference time period;
   a data processing device for creating an industrial process fingerprint representing a situation of interest in an industrial process by calculating hulls for the selected set of reference process variables over the reference time period;
   a storage device for storing the industrial process fingerprint; and
   a management device for acquiring industrial process data from at least one of the plurality of sensors, and calculating a distance between the acquired industrial process data and the industrial process fingerprint to thereby identify the situation of interest.

10. The system of claim 9, further including a feedback device for initiating an action in the industrial process on detection of a threshold by the management device.

11. The industrial process system of claim 9, wherein the situation of interest is one of an upset, an abnormal situation or a regime transition in the industrial process.

* * * * *